(12) United States Patent
Lai et al.

(10) Patent No.: US 8,706,924 B2
(45) Date of Patent: Apr. 22, 2014

(54) PCI-EXPRESS DATA LINK TRANSMITTER EMPLOYING A PLURALITY OF DYNAMICALLY SELECTABLE DATA TRANSMISSION PRIORITY RULES

(75) Inventors: Yen-Ting Lai, Taipei (TW); Wen-Yu Tseng, Taipei County (TW)

(73) Assignee: Via Technologies, Inc., New Taipei (TW)

( * ) Notice: Subject to any disclaimer, the term of this patent is extended or adjusted under 35 U.S.C. 154(b) by 792 days.

(21) Appl. No.: 12/509,056

(22) Filed: Jul. 24, 2009

(65) Prior Publication Data

US 2010/0040087 A1 Feb. 18, 2010

Related U.S. Application Data

(60) Provisional application No. 61/089,048, filed on Aug. 14, 2008.

(51) Int. Cl.
*G06F 3/00* (2006.01)
*H04L 12/56* (2006.01)
*H04L 12/70* (2013.01)

(52) U.S. Cl.
CPC ......... *H04L 47/10* (2013.01); *H04L 2012/5679* (2013.01)
USPC .......................................................... 710/29

(58) Field of Classification Search
CPC ................. H04L 47/10; H04L 2012/5679
USPC ................................................. 710/29
See application file for complete search history.

(56) References Cited

U.S. PATENT DOCUMENTS

| | | | |
|---|---|---|---|
| 5,794,073 A | 8/1998 | Ramakrishnan et al. | |
| 6,961,793 B2 | 11/2005 | Kato | |
| 6,996,684 B2 | 2/2006 | Tseng et al. | |
| 7,525,978 B1 | 4/2009 | Tabatabaee et al. | |
| 7,583,600 B1 | 9/2009 | Schanke et al. | |
| 7,752,473 B1 | 7/2010 | Kwa et al. | |
| 7,779,187 B2 * | 8/2010 | Ikeda et al. | 710/111 |
| 2003/0126297 A1 * | 7/2003 | Olarig et al. | 709/250 |
| 2008/0151753 A1 | 6/2008 | Wynne | |
| 2008/0172509 A1 * | 7/2008 | Tsunoda | 710/241 |

OTHER PUBLICATIONS

PCI Express Base Specification, Revision 1.1, Mar. 28, 2005 pp. 23, 149 and 270.*

* cited by examiner

*Primary Examiner* — Ernest Unelus
*Assistant Examiner* — Ronald Modo
(74) *Attorney, Agent, or Firm* — Richard K. Kushman; James W. Huffman

(57) ABSTRACT

A data link transmitter in a PCI Express device for managing PCI-Express TLPs and DLLPs. The data link transmitter includes a priority system in which a DLLP for initializing flow control has highest priority, and an idle data character has lowest priority. Various embodiments include: a DLLP for power state entrance is lower priority than the DLLP for initializing flow control; a replay TLP for retry buffer re-transmission is lower priority than the DLLP for power state entrance, and a new TLP is lower priority than the replay TLP; an Ack/Nak DLLP is lower priority than the new TLP, a DLLP for updating flow control is lower priority than the Ack/Nak TLP, and a DLLP for acknowledging the DLLP for power state entrance is lower priority than the DLLP for updating flow control; a DLLP for updating flow control is lower priority than the DLLP for power state entrance.

20 Claims, 3 Drawing Sheets

---

| software predicts mix of packet transmissions that the PCI-Express data link transmitter will be making on the PCI-Express link 402 |
|---|

↓

| CPU programs PCI-Express device data link transmitter control register to specify the priority rule that provides improved performance for the mix of packet transmissions the data link transmitter will be making 404 |
|---|

PCI-EXPRESS DATA LINK TRANSMITTER EMPLOYING A PLURALITY OF DYNAMICALLY SELECTABLE DATA TRANSMISSION PRIORITY RULES

CROSS REFERENCE TO RELATED APPLICATIONS

This application claims priority to U.S. Provisional Application 61/089,048, filed Aug. 14, 2008, which is hereby incorporated by reference herein for all purposes.

This application is related to co-pending U.S. patent application Ser. No. 12/509,007 (VIT.07-0075-US) entitled PCI-EXPRESS DATA LINK TRANSMITTER EMPLOYING A PLURALITY OF DYNAMICALLY SELECTABLE DATA TRANSMISSION PRIORITY RULES, which is concurrently filed herewith, and which has a common assignee and common inventor, and which is incorporated by reference.

FIELD OF THE INVENTION

The present invention relates in general to priority scheduling for serial data link transmission, and particularly within the PCI-Express serial interconnect architecture.

BACKGROUND OF THE INVENTION

In recent years, the PCI-Express architecture has become a widely employed high-speed serial link I/O interconnect designed to transfer data between components within a computer system. PCI-Express is a serial architecture that replaces the parallel bus implementations of the PCI and PCI-X bus specification to provide platforms with greater performance, while using a much lower pin count. The PCI-Express architecture is described in the PCI-Express specifications managed and disseminated by the PCI Special Interest Group (SIG).

The PCI-Express architecture describes PCI-Express devices as having three discrete logical layers: the Transaction Layer, the Data Link Layer, and the Physical Layer, each having a transmitter and receiver portion. PCI-Express uses packets to communicate information on a serial link between components. The packets include data link layer packets (DLLPs) generated and consumed by the Data Link Layer, and transaction layer packets (TLPs) generated and consumed by the Transaction Layer. The DLLPs are used to manage the serial data link and include various types such as DLLPs related to initialization, flow control on the serial link, power management, and so forth. The TLPs are used to communicate transactions between the components, such as data read and write transactions, as well as certain types of events.

Multiple DLLPs and TLPs of different types may be scheduled for transmission at the same time. The PCI-Express Data Link Layer includes an arbiter that is in charge of prioritizing the packets for transmission. The arbiter determines which packet to transmit first based on one priority rule. In principle, the priority rule must ensure that all packets for transmission are finished within a regular time and not blocked by other types of packets. The priority rule may affect the transmission performance on a PCI-Express link. For example, assume a scheduled Ack DLLP is stalled waiting for another TLP transmission because the priority rule assigns Ack DLLPs a relatively low transmission priority, and during this time another Ack is scheduled for another received TLP. According to the PCI-Express specification, it is only necessary to transmit the second Ack DLLP, since the information the second Ack DLLP provides will supersede the information in the first Ack DLLP. That is, the Ack DLLPs are "collapsed" into a single Ack DLLP, which is an efficient use of bandwidth. On the other hand, if the priority rule assigns the highest priority to Ack DLLP transmissions, the Ack DLLP will transmit every time for every received TLP, which forfeits the potential benefit of collapsing the Ack DLLPs, which may waste transmission bandwidth. This example provides an illustration of the fact that the one priority rule may affect transmission performance.

The PCI-Express Base Specification Rev. 1.1 specifies a recommended priority rule of scheduled transmissions, shown here:
1. Completion of any transmission (TLP or DLLP) currently in progress (highest priority)
2. Nak DLLP transmissions
3. Ack DLLP transmissions scheduled for transmission as soon as possible due to receipt of a duplicated TLP— OR—expiration of the Ack latency timer
4. Flow Control DLLP transmissions (updateFC)
5. Retry Buffer re-transmissions
6. TLPs from the Transaction Layer
7. Flow Control DLLP transmissions (initFC1 and initFC2)
8. All other DLLP transmissions (lowest priority)

The recommended priority rule specified in the PCI-Express Base Specification lacks flexibility when a root complex (RC) is involved in more complicated transaction behavior and the recommended priority rule may result in lower performance in some circumstances.

BRIEF SUMMARY OF INVENTION

In another aspect, the present invention provides a data link transmitter in a Peripheral Component Interconnect (PCI) Express device for managing PCI-Express Transaction Layers Packets (TLPs) and Data Link Layer Packets (DLLPs). The data link transmitter includes a priority system in which a DLLP for initializing flow control has the highest priority, and an idle data character has the lowest priority. In one aspect, a DLLP for power state entrance is lower priority than the DLLP for initializing flow control. In one aspect, a replay TLP for retry buffer re-transmission is lower priority than the DLLP for power state entrance, and a new TLP is lower priority than the replay TLP. In one aspect, an Ack/Nak DLLP is lower priority than the new TLP, a DLLP for updating flow control is lower priority than the Ack/Nak TLP, and a DLLP for acknowledging the DLLP for power state entrance is lower priority than the DLLP for updating flow control. In one aspect, a DLLP for updating flow control is lower priority than the new TLP, an Ack/Nak DLLP is lower priority than the DLLP for updating flow control, and a DLLP for acknowledging the DLLP for power state entrance is lower priority than the Ack/Nak DLLP. In one aspect, an Ack/Nak DLLP is lower priority than the DLLP for power state entrance. In one aspect, a replay TLP for retry buffer re-transmission is lower priority than the Ack/Nak DLLP, a new TLP is lower priority than the replay TLP, a DLLP for updating flow control is lower priority than the new TLP, and a DLLP for acknowledging the DLLP for power state entrance is lower priority than the DLLP for updating flow control. In one aspect, an Ack/Nak TLP, having a SEQ number larger than acknowledged TLPs, is lower priority than the DLLP for acknowledging the DLLP for power state entrance. In one aspect, a DLLP for updating flow control is lower priority than the Ack/Nak TLP, a replay TLP for retry buffer re-transmission is lower priority than the DLLP for updating flow control, a new TLP is lower priority than the replay TLP, and a DLLP for acknowledging the DLLP for power state entrance is lower priority than the new TLP. In one aspect, a DLLP for updating flow control is lower priority than the DLLP for power state entrance. In one aspect, a replay TLP for retry buffer re-transmission is lower priority than the DLLP for updating flow control, a new TLP is lower priority than the replay TLP, an Ack/Nak DLLP is lower priority than the new TLP, and a DLLP for acknowledging the DLLP for power state entrance is lower priority than the new TLP. In one aspect, an Ack/Nak DLLP is lower priority than the DLLP for updating flow control, a replay TLP for retry buffer re-transmission is lower priority than the Ack/Nak DLLP, a new TLP is lower priority than the replay TLP, and a DLLP for acknowledging the DLLP for power state entrance is lower priority than the new TLP.

In another aspect, the present invention provides a priority method in a data link transmitter of a Peripheral Component Interconnect (PCI) Express device for scheduling PCI-Express Transaction Layers Packets (TLPs) and Data Link Layer Packets (DLLPs). The method includes prioritizing a DLLP for initializing flow control at the highest priority, and prioritizing an idle data character at the lowest priority.

In another aspect, the present invention provides a priority system established in a data link transmitter of a Peripheral Component Interconnect (PCI) Express device for managing transmission of PCI-Express Transaction Layers Packets (TLPs) and Data Link Layer Packets (DLLPs). The priority system includes a highest priority provided for a DLLP for flow control initialization, a second priority provided for a DLLP for power state entrance, and a lowest priority provided for an idle data character.

DETAILED DESCRIPTION OF THE INVENTION

The present specification describes embodiments that, among other things, address the performance problem described above by providing a PCI-Express data link layer transmitter that defines a plurality (seven in one embodiment) of priority rules for scheduling transmissions, i.e., packets. The data link transmitter includes a programmable control register (3-bits in one embodiment) that chooses one of the plurality of priority rules to be used to select the next packet for transmission. Each priority rule may provide improved performance in a corresponding specific transaction pattern. For example, a high-end 3D PCI-Express display card requests a large amount of upstream memory read (MRd) cycles to a PCI-Express Root Complex (RC). The RC needs to transmit back-to-back completion TLPs in order to achieve better transmission performance. Thus, in a transaction pattern with a large amount of upstream MRd cycles, it is advantageous for the data link transmitter to employ one of the plurality of priority rules in which the priority of TLP transmissions is higher than DLLP transmission to increase the likelihood that back-to-back completion of TLPs occurs and minimize the possibility that the back-to-back completion of TLPs is broken by an Ack/Nak DLLP transmission. The ability to select from among multiple priority rules provided by the present invention potentially improves performance over a conventional data link transmitter that employs the single priority rule recommended in the PCI-Express Base Specification.

Figure 1:
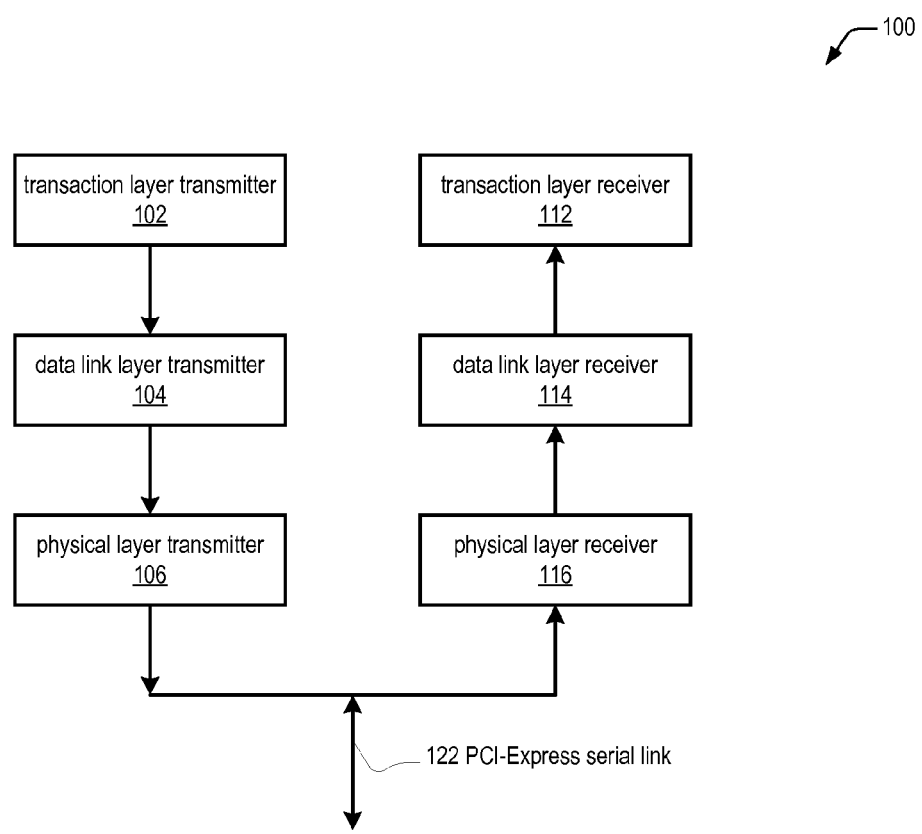
FIG. 1 is a block diagram illustrating a PCI-Express device according to the present invention.

Referring now to FIG. 1, a block diagram illustrating a PCI-Express device 100 according to the present invention is shown. The PCI-Express device 100 may be included within a PCI-Express root complex, endpoint, switch, or bridge. The PCI-Express device 100 includes a transaction layer transmitter 102 coupled to a data link layer transmitter 104, and a physical layer transmitter 106 coupled to the data link layer transmitter 104. The PCI-Express device 100 includes a transaction layer receiver 112 coupled to a data link layer receiver 114, and a physical layer receiver 116 coupled to the data link layer receiver 114. The physical layer transmitter 106 and physical layer receiver are also coupled to a PCI-Express serial link 122 upon which they transmit and receive, respectively, PCI-Express packets (DLLPs and TLPs) with another PCI-Express device coupled to the other end of the serial link 122.

The PCI-Express specifications specifies the PCI-Express architecture in terms of three discrete logical layers, namely the transaction layer, data link layer, and physical layer, each of which is divided into a transmitter and receiver section. The PCI-Express specifications describe in detail the various functions of these logical layers. Elements 102 through 116 correspond to these logical layers and perform the functions described in the PCI-Express specifications. However, unlike the data link layer transmitter described in the PCI-Express specifications that always selects a packet to transmit using a single priority rule, the data link layer transmitter 104 of FIG. 1 according to the present invention is modified relative to the data link layer transmitter described in the PCI-Express specifications such that the data link layer transmitter 104 of FIG. 1 is capable of employing one of a plurality of different priority rules for selecting a packet from among multiple scheduled DLLPs and TLPs, and the particular one of the plurality of priority rules used to select the packet is itself selectable. Advantageously, the particular priority rule used to select the packet is dynamically selectable during operation of the PCI-Express device 100 within a system by programming a control register that specifies the one of the plurality of priority rules to be used.

Although elements 102 through 116 of FIG. 1 are described as logical entities, they are embodied in hardware circuits to perform the functions described herein, which according to some embodiments, may be performed in part by stored programs executing on one or more programmable processors.

Figure 2:
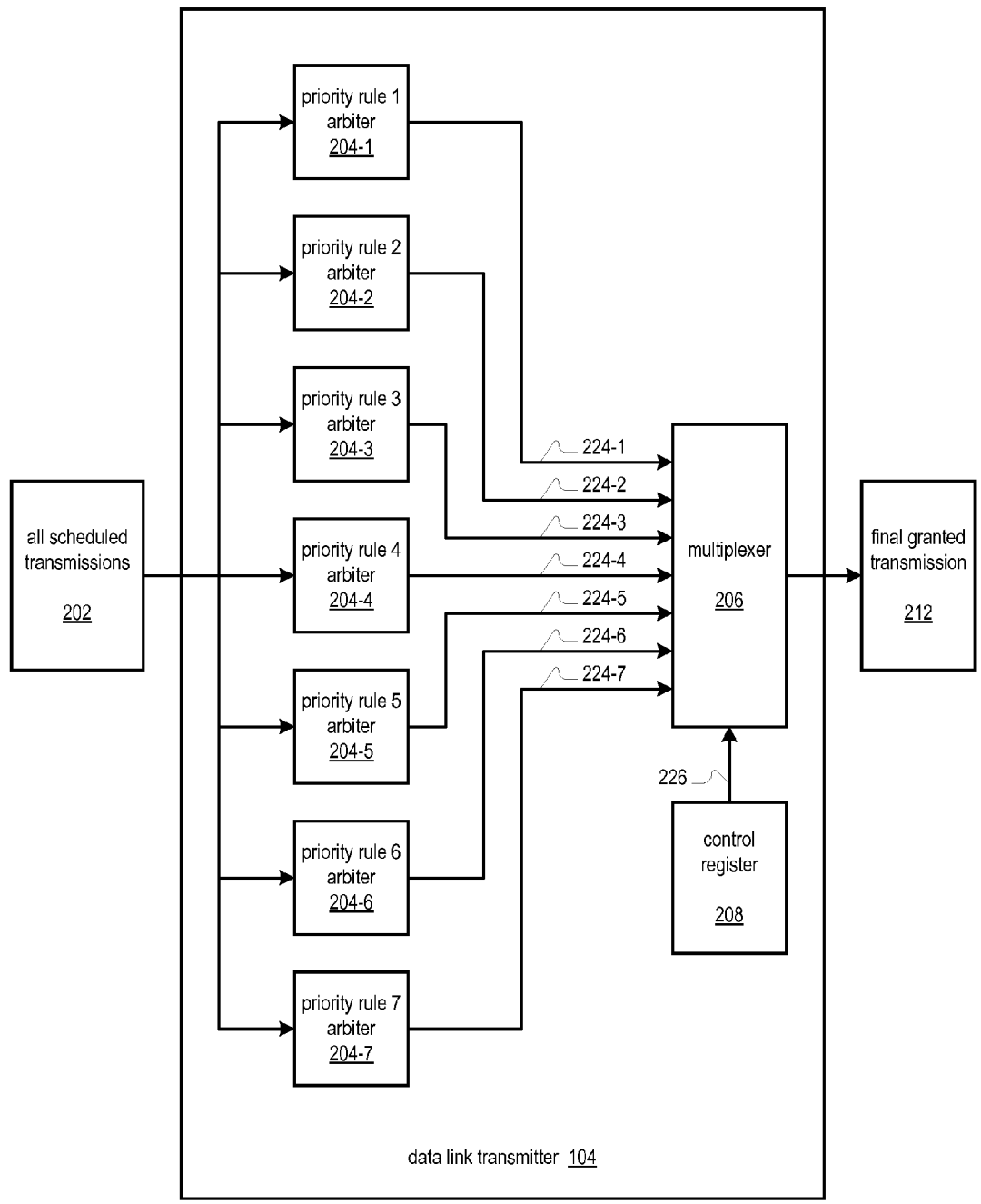
FIG. 2 is a block diagram illustrating a portion of the PCI-Express device of FIG. 1, and particularly the PCI-Express data link layer transmitter of FIG. 1, according to the present invention.

Referring now to FIG. 2, a block diagram illustrating a portion of the PCI-Express device 100 of FIG. 1, and particularly the PCI-Express data link layer transmitter 104 of FIG. 1, according to the present invention is shown. The PCI-Express device 100 includes a pool of scheduled packets 202. The pool of scheduled packets 202 comprises all the DLLPs and TLPs generated by the transaction layer transmitter 102 and data link layer transmitter 104 and that are ready to be transmitted on the serial link 122. In one embodiment, the pool of scheduled packets 202 comprises a plurality of queues of scheduled packets. Each queue holds scheduled packets for a different packet type. Specifically, the different packet types associated with the queues correspond to the various packet types differentiated by the plurality of priority rules discussed below. Thus, for example, according to one embodiment, a different queue exists for each of the packet types specified in Table 1 below, which is effectively a superset of the various packet types specified in Tables 2 through 7 since Priority Rule 1 of Table differentiates two types of packet that are considered as a single type in Tables 2 through 7. In one embodiment, the packets within a queue are transmitted on a first-in-first-out basis relative to packets of the same type.

The data link layer transmitter 104 includes a plurality of priority rule arbiters 204-1, 204-2, 204-3, 204-4, 204-5, 204-6, and 204-7, referred to collectively as priority rule arbiters 204, or arbiters 204. Each of the arbiters 204 is capable of viewing the contents of the pool of scheduled packets 202. Each of the arbiters 204 selects one packet from the pool of scheduled packets 202 for transmission on the serial link 122 according to the priority rule associated with the respective arbiter 204. According to one embodiment: arbiter 204-1 employs Priority Rule 1 of Table 1; arbiter 204-2 employs Priority Rule 2 of Table 2; arbiter 204-3 employs Priority Rule 3 of Table 3; arbiter 204-4 employs Priority Rule 4 of Table 4; arbiter 204-5 employs Priority Rule 5 of Table 5; arbiter 204-6 employs Priority Rule 6 of Table 6; and arbiter 204-7 employs Priority Rule 7 of Table 7. Each arbiter 204 outputs the selected packet on its respective output 224-1 through 224-7, referred to collectively as 224.

The data link layer transmitter 104 also includes a 7-to-1 multiplexer 206. The multiplexer 206 receives on its seven inputs the seven outputs 224-1 through 224-7. A control register 208 provides a control signal 226 to a control input of the multiplexer 206 to control selection of which input 224-1 through 224-7 is provided on the multiplexer 206 output as the final granted transmission 212, i.e., as the packet that will be transmitted on the serial link 122. In one embodiment, the control register 208 is a 3-bit register capable of holding an encoded value that selects one of the arbiter 204 outputs 224. In one embodiment, the control register 208 is programmable, as discussed below with respect to FIG. 4, to enable dynamic selection of the one of the plurality of priority rules during operation of the PCI-Express device 100.

Tables 1 through 7 shown below specify the seven priority rules used by the seven priority rule arbiters 204 of FIG. 2 according to one embodiment. Definitions of the packet types can be found in PCI Express Base Specification Revision 1.1. The following briefly depicts their meanings.

1. Flow Control DLLP transmissions, such as initFC1 and initFC2, are those DLLPs for initializing flow control.
2. Power Management DLLP transmissions, such as PM_Enter_L1, PM_Enter_L23 and PM_Active_State_Request_L1, are those DLLPs for power state entrance.
3. Flow Control DLLP transmission—UpdateFC is a DLLP for updating flow control.
4. Power Management DLLP transmission—PM_Request_Ack is a DLLP for acknowledging the Power Management DLLP transmissions.

TABLE 1

Priority Rule 1.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |

TABLE 1-continued

Priority Rule 1.

| Priority | Packet Type |
|---|---|
| 3 | Ack/Nak DLLP transmissions (caused by receipt of a duplicated TLP -OR- receipt of a bad TLP -OR- expiration of the Ack latency timer) |
| 4 | Replay TLP transmissions (Retry Buffer re-transmissions) |
| 5 | New TLP transmissions (TLPs from the Transaction Layer include Completion TLPs) |
| 6 | Flow control DLLP transmissions (UpdateFC) |
| 7 | Power Management DLLP transmissions (PM_Request_Ack) |
| 8 | Ack/Nak DLLP transmissions (receipt of a TLP whose SEQ number is larger than Ack'ed TLP SEQ number) |
| 9 | Transmission Idle (No scheduled transmissions) |

TABLE 2

Priority Rule 2.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |
| 3 | Replay TLP transmissions (Retry Buffer re-transmissions) |
| 4 | New TLP transmissions (TLPs from the Transaction Layer include Completion TLPs) |
| 5 | Ack/Nak DLLP transmissions (caused by receipt of a duplicated TLP -OR- receipt of a bad TLP -OR- expiration of the Ack latency timer -OR- receipt of a TLP whose SEQ number is larger than Ack'ed TLP SEQ number) |
| 6 | Flow control DLLP transmissions (UpdateFC) |
| 7 | Power Management DLLP transmissions (PM_Request_Ack) |
| 8 | Transmission Idle (No scheduled transmissions) |

TABLE 3

Priority Rule 3.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |
| 3 | Replay TLP transmissions (Retry Buffer re-transmissions) |
| 4 | New TLP transmissions (TLPs from the Transaction Layer include Completion TLPs) |
| 5 | Flow control DLLP transmissions (UpdateFC) |
| 6 | Ack/Nak DLLP transmissions (caused by receipt of a duplicated TLP -OR- receipt of a bad TLP -OR- expiration of the Ack latency timer -OR- receipt of a TLP whose SEQ number is larger than Ack'ed TLP SEQ number) |
| 7 | Power Management DLLP transmissions (PM_Request_Ack) |
| 8 | Transmission Idle (No scheduled transmissions) |

TABLE 4

Priority Rule 4.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |
| 3 | Ack/Nak DLLP transmissions (caused by receipt of a duplicated TLP -OR- receipt of a bad TLP -OR- expiration of the Ack latency timer -OR- receipt of a TLP whose SEQ number is larger than Ack'ed TLP SEQ number) |
| 4 | Replay TLP transmissions (Retry Buffer re-transmissions) |
| 5 | New TLP transmissions (TLPs from the Transaction Layer include Completion TLPs) |

TABLE 4-continued

Priority Rule 4.

| Priority | Packet Type |
|---|---|
| 6 | Flow control DLLP transmissions (UpdateFC) |
| 7 | Power Management DLLP transmissions (PM_Request_Ack) |
| 8 | Transmission Idle (No scheduled transmissions) |

TABLE 5

Priority Rule 5.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |
| 3 | Ack/Nak DLLP transmissions (caused by receipt of a duplicated TLP -OR-receipt of a bad TLP -OR- expiration of the Ack latency timer -OR- receipt of a TLP whose SEQ number is larger than Ack'ed TLP SEQ number) |
| 4 | Flow control DLLP transmissions (UpdateFC) |
| 5 | Replay TLP transmissions (Retry Buffer re-transmissions) |
| 6 | New TLP transmissions (TLPs from the Transaction Layer include Completion TLPs) |
| 7 | Power Management DLLP transmissions (PM_Request_Ack) |
| 8 | Transmission Idle (No scheduled transmissions) |

TABLE 6

Priority Rule 6.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |
| 3 | Flow control DLLP transmissions (UpdateFC) |
| 4 | Replay TLP transmissions (Retry Buffer re-transmissions) |
| 5 | New TLP transmissions (TLPs from the Transaction Layer include Completion TLPs) |
| 6 | Ack/Nak DLLP transmissions (caused by receipt of a duplicated TLP -OR-receipt of a bad TLP -OR- expiration of the Ack latency timer -OR- receipt of a TLP whose SEQ number is larger than Ack'ed TLP SEQ number) |
| 7 | Power Management DLLP transmissions (PM_Request_Ack) |
| 8 | Transmission Idle (No scheduled transmissions) |

TABLE 7

Priority Rule 7.

| Priority | Packet Type |
|---|---|
| 1 | Flow Control DLLP transmissions (initFC1 and initFC2) |
| 2 | Power Management DLLP transmissions (PM_Enter_L1, PM_Enter_L23 and PM_Active_State_Request_L1) |
| 3 | Flow control DLLP transmissions (UpdateFC) |
| 4 | Ack/Nak DLLP transmissions (caused by receipt of a duplicated TLP -OR-receipt of a bad TLP -OR- expiration of the Ack latency timer -OR- receipt of a TLP whose SEQ number is larger than Ack'ed TLP SEQ number) |
| 5 | Replay TLP transmissions (Retry Buffer re-transmissions) |
| 6 | New TLP transmissions (TLPs from the Transaction Layer include Completion TLPs) |
| 7 | Power Management DLLP transmissions (PM_Request_Ack) |
| 8 | Transmission Idle (No scheduled transmissions) |

Figure 3:
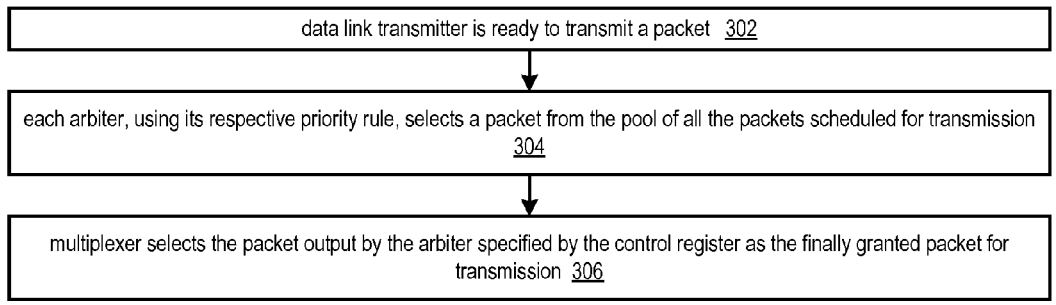
FIG. 3 is a flowchart illustrating operation of the PCI-Express data link layer transmitter of FIG. 2 according to the present invention.

Referring now to FIG. 3, a flowchart illustrating operation of the PCI-Express data link layer transmitter 104 of FIG. 2 according to the present invention is shown. Flow begins at block 302.

At block 302, the data link layer transmitter 104 is ready to transmit a packet (i.e., DLLP or TLP from the pool of scheduled packets 202) on the PCI-Express serial link 122 of FIG. 1. Generally, the data link layer transmitter 104 is permitted to transmit at will. However, certain restraints, such as initialization or flow control restraints, may require the data link layer transmitter 104 to wait to transmit a packet. Flow proceeds to block 304.

At block 304, each of the seven arbiters 204 of FIG. 2 examines the packets scheduled for transmission from the pool 202 of FIG. 2 and selects one of the packets for transmission. Each arbiter 204 uses its respective priority rule (i.e., one of the priority rules from Tables 1 through 7 above) to select the packet. Each arbiter 204 outputs the selected packet on its respective output 224-1 through 224-7 of FIG. 2, each of which is provided to the multiplexer 206 of FIG. 2. Flow proceeds to block 306.

At block 306, the multiplexer 206 selects one of the inputs 224-1 through 224-7 as the final granted packet for transmission 212. Specifically, the multiplexer 206 selects as the final granted packet for transmission 212 the one of the packets 224-1 through 224-7 specified by the output 226 of the control register 208. Flow ends at block 306.

Figure 4:
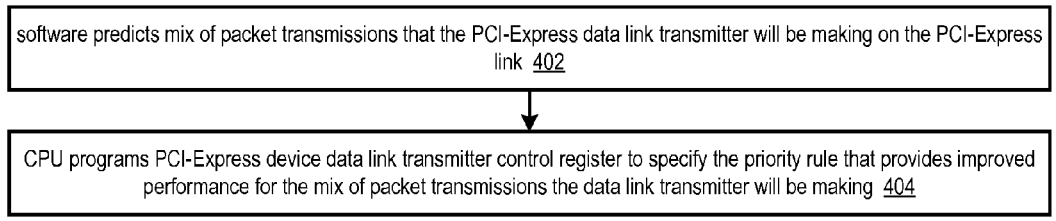
FIG. 4 is a flowchart illustrating the programmability of the control register of FIG. 2 according to an embodiment of the present invention.

Referring now to FIG. 4, a flowchart illustrating the programmability of the control register 208 of FIG. 2 according to an embodiment of the present invention is shown. Flow begins at block 402.

At block 402, an entity predicts that a particular Priority Rule of Table 1 through 7 will yield the best performance for a mix, or stream, of packet types that the data link layer transmitter 104 of FIG. 2 will be transmitting on the serial link 122 in the near future. The predicting entity may be system software, such as a device driver executing on the system CPU. The predicting entity may be the paired PCI-Express device coupled to the PCI-Express device 100 of FIG. 1 by the serial link 122, such as a video controller, storage device controller, network interface controller, and so forth; or, the predicting entity may be the software controlling the paired PCI-Express device. For example, the PCI-Express device 100 of FIG. 1 may be a root complex coupled to a PCI-Express video card, and the video controller, or software controlling the video controller, knows that soon the video controller will be requesting the root complex to transmit a large number of Memory Read Completion TLPs to the video controller. Furthermore, the video controller, or software controlling the video controller, knows that one of the particular Priority Rules of Table 1 through 7 will likely yield the best performance for a stream of packets predominated by TLPs, such as Memory Read Completion TLPs. Flow proceeds to block 404.

At block 404, the predicting entity programs the control register 208 of FIG. 2 with the specific value to select the appropriate Priority Rule that is likely to provide the best performance for the mix of packet type transmissions that the data link layer transmitter 104 will be performing in the near future. Flow ends at block 404.

As may be observed from the forgoing, the flexibility provided by the embodiments described herein through the ability to select from among a plurality of priority rules to select a packet to transmit from among multiple DLLPs and TLPs of different types may result in better performance than a PCI-Express data link layer transmitter that always employs the same single priority rule. This may be particularly true in situations in which a PCI-Express Root Complex is involved with complicated transaction streams and/or different types of PCI-Express end-point devices.

Although various embodiments have been described in which the control register of the PCI-Express data link transmitter is programmed by a CPU connected to the root complex, the PCI-Express data link transmitter may include a PCI-Express slave interface to accept PCI Configuration write cycles to enable other PCI-Express masters to program the control register. Furthermore, although embodiments have been described in which the PCI-Express data link transmitter is within a PCI-Express root complex, the data link transmitter may be employed within any PCI-Express device, including a PCI-Express endpoint, switch, or bridge. Still further, although embodiments have been described in which the data link transmitter may employ a particular number of priority rules (seven according to one embodiment), other numbers of priority rules are contemplated, and the invention is not limited to a particular number. Finally, although embodiments have been described particular priority rules, other priority rules are contemplated, and the invention is not limited to the particular priority rules described.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core or chipset core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device or chipset device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A data link transmitter in a Peripheral Component Interconnect (PCI) Express device for managing PCI-Express Transaction Layers Packets (TLPs) and Data Link Layer Packets (DLLPs), the data link transmitter comprising:
a programmable control register, configured to enable dynamic selection of one of a plurality of priority rules during operation of the PCI Express device, wherein the one of the plurality of priority rules comprises the following rules:
a DLLP for initializing flow control has the highest priority; and
an idle data character has the lowest priority,
wherein the programmable control register is programmed by a CPU according to the types of the DLLPs and the TLPs.

2. The data link transmitter of claim 1, wherein the one of the plurality of priority rules further comprises:
a DLLP for power state entrance is lower priority than the DLLP for initializing flow control.

3. The data link transmitter of claim 2, wherein the one of the plurality of priority rules further comprises:
a replay TLP for retry buffer re-transmission is lower priority than the DLLP for power state entrance; and
a new TLP is lower priority than the replay TLP.

4. The data link transmitter of claim 3, wherein the one of the plurality of priority rules further comprises:
an Ack/Nak DLLP is lower priority than the new TLP;
a DLLP for updating flow control is lower priority than the Ack/Nak TLP; and
a DLLP for acknowledging the DLLP for power state entrance is lower priority than the DLLP for updating flow control.

5. The data link transmitter of claim 3, wherein the one of the plurality of priority rules further comprises:
a DLLP for updating flow control is lower priority than the new TLP;
an Ack/Nak DLLP is lower priority than the DLLP for updating flow control; and
a DLLP for acknowledging the DLLP for power state entrance is lower priority than the Ack/Nak DLLP.

6. The data link transmitter of claim 2, wherein the one of the plurality of priority rules further comprises:
an Ack/Nak DLLP is lower priority than the DLLP for power state entrance.

7. The data link transmitter of claim 6, wherein the one of the plurality of priority rules further comprises:
a replay TLP for retry buffer re-transmission is lower priority than the Ack/Nak DLLP;
a new TLP is lower priority than the replay TLP;
a DLLP for updating flow control is lower priority than the new TLP; and
a DLLP for acknowledging the DLLP for power state entrance is lower priority than the DLLP for updating flow control.

8. The data link transmitter of claim 7, wherein the one of the plurality of priority rules further comprises:
an Ack/Nak TLP, having a SEQ number larger than acknowledged TLPs, is lower priority than the DLLP for acknowledging the DLLP for power state entrance.

9. The data link transmitter of claim 6, wherein the one of the plurality of priority rules further comprises:
a DLLP for updating flow control is lower priority than the Ack/Nak TLP;
a replay TLP for retry buffer re-transmission is lower priority than the DLLP for updating flow control;
a new TLP is lower priority than the replay TLP; and
a DLLP for acknowledging the DLLP for power state entrance is lower priority than the new TLP.

10. The data link transmitter of claim 2, wherein the one of the plurality of priority rules further comprises:
a DLLP for updating flow control is lower priority than the DLLP for power state entrance.

11. The data link transmitter of claim 10, wherein the one of the plurality of priority rules further comprises:
a replay TLP for retry buffer re-transmission is lower priority than the DLLP for updating flow control;
a new TLP is lower priority than the replay TLP;
an Ack/Nak DLLP is lower priority than the new TLP; and a DLLP for acknowledging the DLLP for power state entrance is lower priority than the new TLP.

12. The data link transmitter of claim 10, wherein the one of the plurality of priority rules further comprises:
an Ack/Nak DLLP is lower priority than the DLLP for updating flow control;
a replay TLP for retry buffer re-transmission is lower priority than the Ack/Nak DLLP;
a new TLP is lower priority than the replay TLP; and
a DLLP for acknowledging the DLLP for power state entrance is lower priority than the new TLP.

13. A priority method in a data link transmitter of a Peripheral Component Interconnect (PCI) Express device for scheduling PCI-Express Transaction Layers Packets (TLPs) and Data Link Layer Packets (DLLPs), the method comprising:
prioritizing a DLLP for initializing flow control at the highest priority;
prioritizing an idle data character at the lowest priority; and
enabling dynamic selection of one of a plurality of priority rules during operation of the PCI Express device by a programmable control register,
wherein the programmable control register is programmed by a CPU according to the types of the DLLPs and the TLPs.

14. The method of claim 13, further comprising:
scheduling a DLLP for power state entrance, an Ack/Nak DLLP, a reply TLP for retry buffer re-transmission, a new TLP, a DLLP for updating flow control, and a DLLP for acknowledging the DLLP for power state entrance.

15. The method of claim 14, further comprising:
prioritizing the DLLP for power state entrance at the second highest priority.

16. The method of claim 14, further comprising:
prioritizing the new TLP directly behind the replay TLP.

17. The method of claim 14, further comprising:
prioritizing the DLLP for acknowledging the DLLP for power state entrance directly before the idle data character.

18. A priority system established in a data link transmitter of a Peripheral Component Interconnect (PCI) Express device for managing transmission of PCI-Express Transaction Layers Packets (TLPs) and Data Link Layer Packets (DLLPs), the priority system comprising:
a programmable control register, configured to enable dynamic selection of one of a plurality of priority rules during operation of the PCI Express device, wherein the programmable control register is programmed by a CPU according to the types of the DLLPs and TLPs, and wherein the one of the plurality of priority rules comprises:
a highest priority provided for a DLLP for flow control initialization;
a second priority provided for a DLLP for power state entrance; and
a lowest priority provided for an idle data character.

19. The priority system of claim 18, wherein the one of the plurality of priority rules further comprises:
two priorities sequentially provided for a replay TLP of buffer re-transmission retry and a new TLP.

20. The priority system of claim 18, wherein the one of the plurality of priority rules further comprises:
a priority above the lowest priority provided for a DLLP for power state entrance acknowledgement.

* * * * *